March 5, 1957    K. G. KIMBLE ET AL    2,783,774
CONTROL VALVE FOR A PNEUMATIC PRESSURE SYSTEM
Filed July 16, 1953

Inventors:
KENNETH G. KIMBLE
ROBERT C. GAGE
PAUL H. GREVENGOED
By: *Attorney*

2,783,774

CONTROL VALVE FOR A PNEUMATIC PRESSURE SYSTEM

Kenneth G. Kimble, Robert C. Gage, and Paul H. Grevengoed, Grand Rapids, Mich., assignors to National Brass Company, Grand Rapids, Mich., a corporation of Michigan Application July 16, 1953, Serial No. 368,288

2 Claims. (Cl. 137—544)

The present invention provides a control valve for a pneumatic pressure system, and was developed primarily for use in conjunction with a conventional pneumatic door closer. Essentially, these door closers consist of a piston-cylinder assembly that is extended and shortened by the opening and closing of a door so as to reciprocate the piston within the cylinder. It is conventional to provide that the opening movement of the door is subject to very little restraint beyond that of the friction of the device, while closing of the door generates pressure ahead of the piston so as to reduce the velocity of swing and prevent slamming. It is preferable to provide some sort of a control in conjunction with this basic mechanism in the form of a bleed valve permitting a controllable quantity of air to escape to regulate the closing velocity. The present invention is related to the construction of this control valve, and to a relief valve acting in cooperation with the air cylinder to limit the pressure that can be developed in the air cylinder so as to prevent "rebound" of the door.

In the preferred form of the valve construction, the present invention includes a threaded valve member operating in a correspondingly threaded passage coaxially arranged with respect to the air cylinder, and preferably at the end of the cylinder opposite from the piston rod. The valve member cooperates with a suitably-formed valve seat, and relative rotation between the threaded valve member and the passage moves the valve member to and from engagement with the seat. Air under pressure passing across the valve seat proceeds outwardly through channels established between the valve member and the threaded passage. These channels are preferably established through forming the valve member with a substantially polygonal (preferably square) cross section, so that each of the channels may be considered as defined by the surfaces between the corners of the polygonal cross section and the curved surface of the threaded passageway. The use of a valve member engaging the threaded passageway only at corners (of the polygonal cross section) rather than over substantial sectors simplifies the manufacture of the valve member and produces very satisfactory performance.

As the air under pressure emerges from these several channels, it preferably enters into an intermediate chamber. An exhaust outlet is provided from the chamber to the outside atmosphere, with the area of this outlet of such dimensions that the air may emerge at a relatively low velocity. This arrangement results in minimizing the hissing sound frequently occurring in door closers and resulting from discharge of high-velocity air directly from a small aperture into the atmosphere. The presence of the chamber acts to a considerable degree to muffle the sound as the air discharges from the several channels around the valve member into the chamber.

A further reduction in the noise level may be accomplished through the use of a filter element interposed in the opening through which air from the chamber is exhausted to the outside atmosphere. The presence of the filtering element also removes a tendency for foreign material to accumulate in and around the valve mechanism where it might interfere with exhaust and with the adjustability of the valve.

The preferred form of construction for establishing the intermediate exhaust chamber involves the use of a hollow control knob through which the valve member is adjusted. Since the exhaust takes place around the valve member itself, the presence of the hollow knob establishes the desired chamber without the necessity of providing elaborate structure on the air cylinder assembly. This arrangement results in a rather pleasing appearance, incidentally, since the formation of the knob can be established so as to complete the contours at the end of the cylinder while still providing a very substantial gripping surface for the rotation of the valve member.

When a door is first released by the hand after the door has been opened, the closing spring of the door closer applies a torque which builds up a considerable angular closing velocity of the door. This tendency is opposed by the build-up of air pressure in the air cylinder, and a point is finally reached where the kinetic energy of the inertia of the door has been converted into air pressure. This air pressure is in excess of the amount required to oppose the closing spring, and the door tends to "rebound" toward open position. To counteract this action, the present invention provides for bleeding off air pressure in excess of that required to oppose the closing spring.

The several features of the present invention will be discussed in detail through an analysis of the particular embodiments illustrated in the accompanying drawings. In these drawings, Figure 1 shows a plan view illustrating the installation of a door closer constructed according to the present invention.

Figure 1:
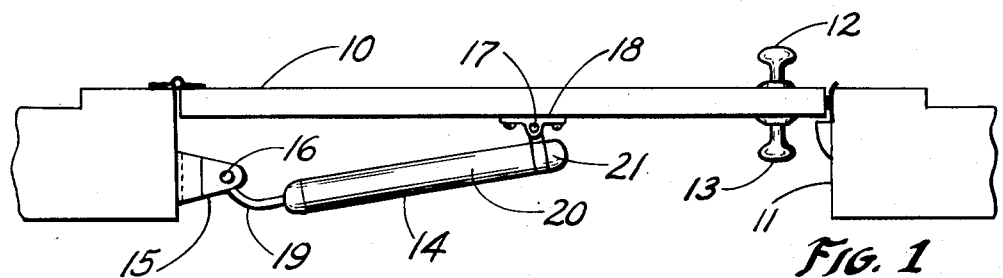

Referring to Figure 1, a screen door 10 is shown mounted in a conventional fashion in a doorway 11. The usual knobs 12 and 13 operate the usual latch mechanism, and a pneumatic door closer generally indicated at 14 has the dual function of preventing slamming of the door and bringing the door firmly to closed position. Biasing the door toward the closed position shown in Figure 1 is conventionally provided through a coil spring mounted in conjunction with the bracket 15. The door closer 14 is pivotally mounted about the pin 16 at its inner end, and its outer end is pivotally mounted at the pin 17 on a bracket 18 secured to the door 10. Opening and closing the door 10 will result in reciprocating the piston rod 19 within the air cylinder 20. The rate of closing the door can be adjusted by manipulation of the control knob 21 through a mechanism shown in Figures 2 and 3.

Figure 2:
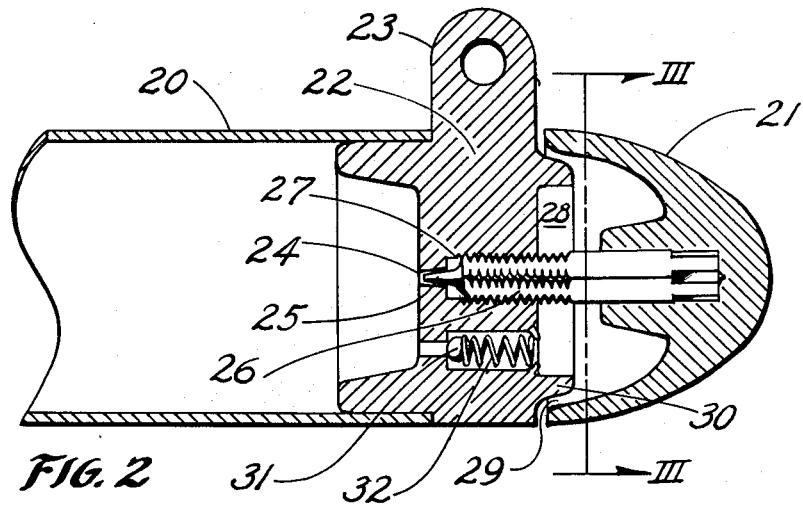
Figure 2 is an axial section on an enlarged scale of the device illustrated in Figure 1 taken of a portion at the end and illustrating the valve construction.
Figure 3:
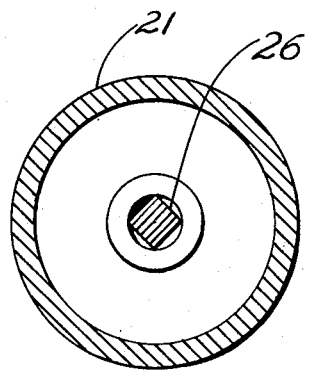
Figure 3 is a section taken on the plane 3—3 of Figure 2.

Referring to Figures 2 and 3, the air cylinder 20 is formed as a thin-walled tube in the interest of economy, with a preferably die-cast head member 22. This member has a lateral projection 23 providing the point of attachment for the pivot mounting 17. Air compressed within the cylinder 20 on closing movement of the door is permitted to pass outwardly through the tapered hole 24 forming a valve seat which is usually at least partially obstructed by the tapered end 25 of the valve member 26. The valve member operates within a threaded passage 27, and escape channels for air passing through the opening 24 are established between the "flats" of the square cross section of the threaded shank of the valve member 26 and the threaded wall of the passage 27. Air passing through these four channels emerges into a chamber 28 established by the hollow interior of the knob 21 mounted on the valve member 26. Air entering the chamber 28 is exhausted into the atmosphere through the annular opening 29 existing between the interior surface of the knob 21 and the exterior surface of the annular flange 30 formed as a part of the cylinder head 22. Rotation of the control knob 21 will therefore induce axial movement of the valve member 26 with respect to the threaded passageway 27, and will thereby adjust the relative position of the tapered point of the valve member in the similarly tapered opening 24. Regulation of the resistance to flow in this manner will adjust the rate of closing of the door.

The ball valve system 31 is biased toward closed position by the spring 32, providing an auxiliary exhaust passage, and permits the exhaust of air after a certain pressure has been reached within the cylinder. Such release of very high pressures by this relief valve will tend to prevent "rebound" of the door due to the natural spring-like tendencies of air under pressure. A considerable amount of inertia is involved as a door begins to swing closed under the action of the spring of the bracket 15; and as the air builds up sufficient pressure to oppose this door movement, the inertia becomes dissipated. After a zero velocity has been reached, the rather high pressure remaining in the cylinder is often sufficient to bounce the door again in the opening direction. The bleeding off of high pressures through the use of the auxiliary ball valve will prevent this tendency.

Figure 4:
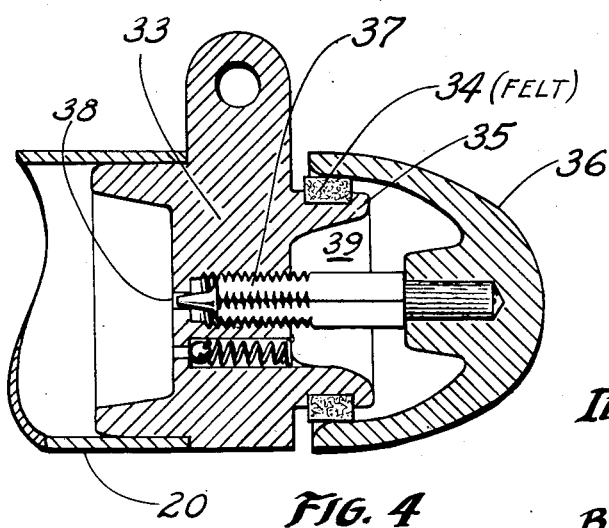
Figure 4 shows a modified form of the present invention which includes a filter member.

Referring to Figure 4, a modified form of the present invention is illustrated in which a similar cylinder 20 is used, but provides sufficient alteration in the structure of the head member 33 to accommodate an annular (preferably felt) filter member 34 interposed in the opening between the annular flange 35 and the inside surface of the adjusting knob 36. The valve member 37 and the valve opening 38 may be exactly the same as shown in Figures 2 and 3. The position of the felt filter member 34 in the opening through which the air is exhausted from the chamber 39 to the outer atmosphere tends to reduce the noise level, and also to bar the ingress of foreign material which might interfere with the action of the valve and the adjustment thereof.

The particular embodiments of the present invention which have been illustrated and discussed herein are for illustrative purposes only, and are not to be considered as a limitation upon the scope of the appended claims. In these claims, it is our intent to claim the entire invention disclosed herein, except as we are limited by the prior art.

We claim:

1. A control valve for a pneumatic cylinder, said valve comprising: means forming a threaded passage having a valve seat therein and communicating with said cylinder, said passage being coaxial with said cylinder; a valve member having a portion adapted to cooperate with said valve seat and a threaded shank portion of non-circular cross section adapted to engage said threaded passage; a hollow control knob secured to said valve member, said control knob having an annular portion with a substantially cylindrical inner surface disposed adjacent structure fixed with respect to said passage; means forming a chamber continuing between said threaded passage and the opening between said annular portion and fixed structure; and filter means disposed in said opening.

2. A control valve for a fluid pressure system, said valve comprising: means forming a threaded passage having a valve seat therein and communicating with said pressure system; a valve member having a portion adapted to cooperate with said valve seat and a threaded shank portion of non-circular cross section adapted to engage said threaded passage; a control knob secured to said valve member, said control knob having an annular portion thereof disposed adjacent structure fixed with respect to said passage; means forming a chamber continuing between said threaded passage and the opening between said annular portion and fixed structure; and filter means disposed in said opening.

References Cited in the file of this patent

UNITED STATES PATENTS

| 552,006 | Runkel | Dec. 24, 1895 |
| 1,077,781 | Yaeger | Nov. 4, 1913 |
| 1,131,823 | Clevenger | Mar. 16, 1915 |
| 1,143,700 | Hamill | June 22, 1915 |
| 1,221,093 | Rogers | Apr. 3, 1917 |
| 1,313,797 | DeMilt | Aug. 19, 1919 |
| 1,347,951 | Hohmann | July 27, 1920 |
| 1,430,368 | Frackleton | Sept. 26, 1922 |
| 1,536,415 | Beck | May 5, 1925 |
| 1,602,079 | Kraft | Oct. 5, 1926 |
| 1,649,620 | Siefen | Nov. 15, 1927 |
| 1,759,649 | Lebherz | May 20, 1930 |
| 1,839,042 | McPartland | Dec. 29, 1931 |
| 1,901,979 | Meusy | Mar. 21, 1933 |
| 2,188,850 | Zinkil | Jan. 30, 1940 |
| 2,663,311 | Samaras | Dec. 22, 1953 |

FOREIGN PATENTS

| 211,511 | Germany | July 3, 1909 |